United States Patent [19]

Gaiser et al.

[11] 4,366,903

[45] Jan. 4, 1983

[54] MAGAZINE FOR MAGNETIC TAPE CASSETTES

[75] Inventors: Dieter Gaiser, Rheinau-Diersheim; Kurt Schmidts, Kehl; Volker Scherer; Hubert Koob, both of Willstaett, all of Fed. Rep. of Germany

[73] Assignee: BASF Aktiengesellschaft, Ludwigshafen, Fed. Rep. of Germany

[21] Appl. No.: 307,867

[22] Filed: Oct. 2, 1981

Related U.S. Application Data

[63] Continuation of Ser. No. 113,021, Jan. 17, 1980, abandoned.

[30] Foreign Application Priority Data

Feb. 9, 1979 [DE] Fed. Rep. of Germany ... 7903580[U]

[51] Int. Cl.³ .................. B65D 85/30; B65D 85/672
[52] U.S. Cl. .................................. 206/387; 206/455; 211/40
[58] Field of Search .............. 206/387, 316, 417, 455, 206/561, 594, 821, 389; 211/40, 71, 126, 133; 312/10, 319, DIG. 33

[56] References Cited

U.S. PATENT DOCUMENTS

| | | |
|---|---|---|
| D. 247,646 | 3/1978 | Wordhall . |
| T927,008 | 10/1974 | Sherman .......................... 206/387 |
| 1,791,594 | 2/1931 | Herring ........................... 206/561 |
| 2,501,379 | 3/1950 | Cranston ......................... 206/561 |
| 3,674,132 | 7/1972 | Loss ................................. 206/387 |
| 3,756,383 | 9/1973 | Kryter . |
| 3,897,871 | 8/1975 | Zinnbauer ....................... 211/40 |
| 3,907,116 | 9/1975 | Wolf . |
| 4,117,931 | 10/1978 | Berkman . |
| 4,203,519 | 5/1980 | Fujitaki ............................ 206/387 |

FOREIGN PATENT DOCUMENTS

| | | |
|---|---|---|
| 7301641 | 3/1973 | Fed. Rep. of Germany . |
| 2207417 | 8/1973 | Fed. Rep. of Germany ...... 206/387 |

Primary Examiner—Herbert F. Ross
Attorney, Agent, or Firm—Keil & Witherspoon

[57] ABSTRACT

A magazine for magnetic tape cassettes, comprising a trough which is U-shaped in cross section and open at the ends, and which possesses a plurality of transverse ribs on the bottom, between which ribs the cassettes are accommodated, the side members of the trough being provided with resilient strips for firmly holding the cassettes.

4 Claims, 1 Drawing Figure

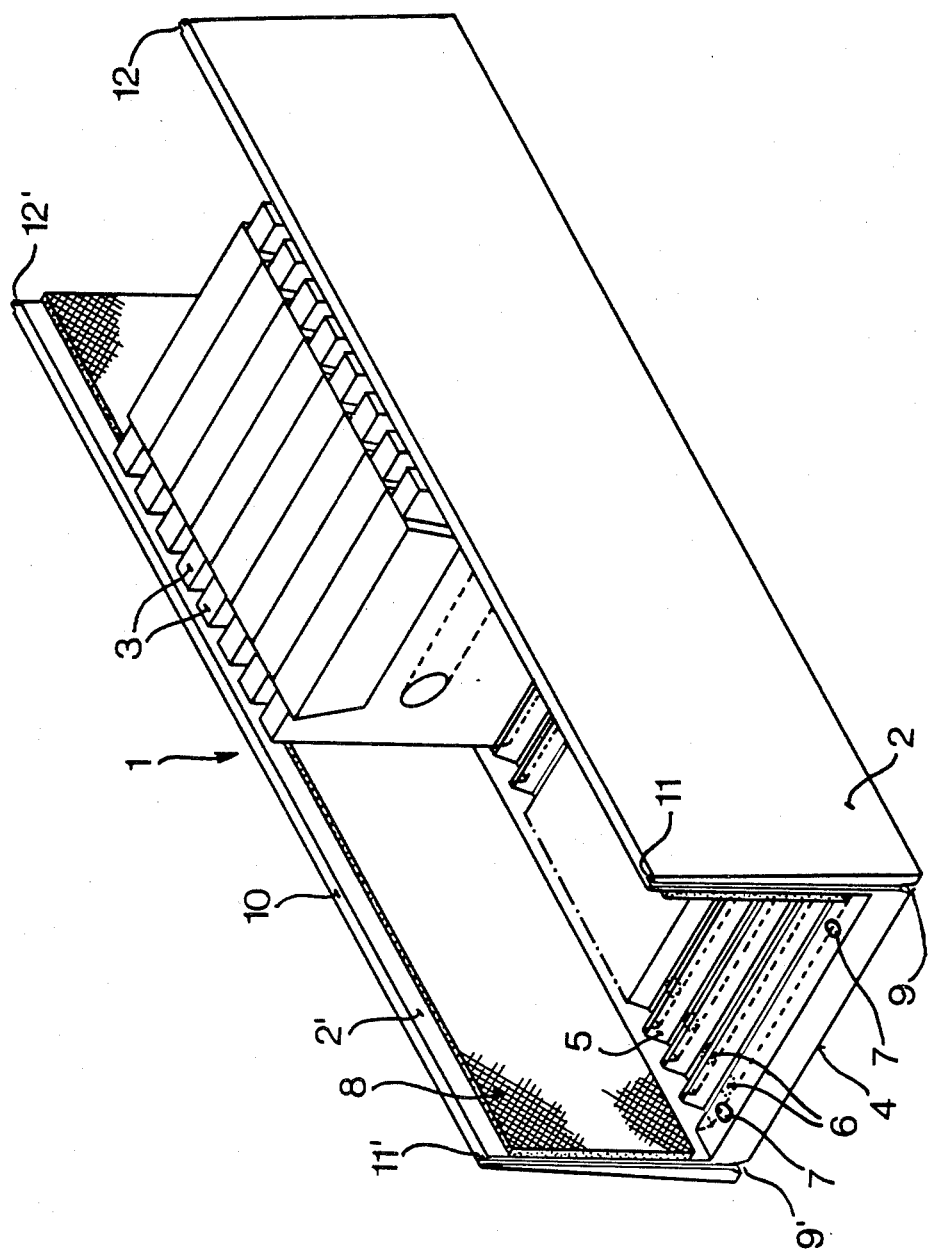

MAGAZINE FOR MAGNETIC TAPE CASSETTES

This is a continuation of application Ser. No. 113,021, filed Jan. 17, 1980, now abandoned.

The present invention relates to a magazine for magnetic tape cassettes, comprising a trough which is U-shaped in cross section and possesses a plurality of transverse ribs on the bottom, the ribs being arranged at intervals corresponding to the thickness of a magnetic tape cassette.

German Utility Model Application G No. 7,301,641 discloses a magazine, described as a packaging box for tape cassettes, which consists of a container which can be covered by a transparent lid, but is otherwise closed on all sides. The bottom of the container is provided with ribs, cassettes being inserted between pairs of adjacent ribs.

This container is not very suitable for use as a means of transporting magnetic tape cassettes, or cassette housing components, between assembly stations in the production of magnetic tape cassettes. It is necessary to insert the cassettes individually, either manually or by complicated gripper mechanisms, and the cassettes must then be secured by locking members for transport and for bringing them into any desired position, and must then again be taken out individually. As a result of their rubbing against one another and against the container and the ribs, the cassettes can become scratched and scuffed during transport, and these scratches and scuff marks must subsequently be removed in an additional process step. Furthermore, stacking of the filled containers without the transparent lids is impossible, since the cassettes inserted into the container project above the walls of the container.

An object of the present invention is to provide a magazine which can be used both for magnetic tape cassettes and for halves of cassette housings and which does not have the above disadvantages. A particular object of the invention is to provide a magazine which is suitable for use in the mechanized assembled sequence of cassette production.

We have found that these objects are achieved with a magazine wherein the trough is open at both ends and the two side members of the trough, which project above the inserted magnetic tape cassettes, are each provided on their inner surfaces, over their entire length, with a strip of resilient material, the clear width between the side members carrying these strips being smaller, by an amount about equal to the reduction in the thickness of the strips in the compressed state, than the relevant dimension of the magnetic tape cassettes which are to be inserted.

In an advantageous embodiment of the magazine, the ribs taper conically toward the large open side of the trough.

In a further advantageous embodiment, the side members can be resiliently bent apart.

In a further embodiment of the magazine according to the invention, the trough bottom is perforated at one or more points between adjacent ribs.

In a further embodiment of the invention, the trough is provided, on its underside, with grooves which register with the upper edges of the two side members.

In a preferred embodiment of the invention, the side members at one end each possess a groove extending over the height of the side member, whereas the side members at the other end each possess a tongue which registers with this groove.

The magnetic tape cassettes or cassette housing components, arriving on the assembly line ranged side by side, can be transferred, in one manipulation, as a block into the magazine by inverting the latter over the group of cassettes, and can be held firmly therein, in any position of the magazine, without any additional mechanism and without any additional operations, and thus be protected against damage. Inversion of the magazine over the cassettes can also be effected by conventional mechanical grippers.

In a particularly advantageous embodiment of the magazine according to the invention, in which holes are provided between the ribs in the bottom of the magazine, the magazine can also be unloaded mechanically, by means of ejector pins.

Further, the invention provides design features which ensure that the magazines can be stacked securely and can be connected together in a row.

The magazine according to the invention is described in more detail below with reference to an embodiment shown in the accompanying drawing.

The single FIGURE of the drawing shows a schematic perspective overall view of one embodiment of the magazine according to the invention.

The magazine is a trough 1 which is U-shaped in cross section and is preferably an injection molding of a plastic, for example polyvinyl chloride. The trough 1 is open at the ends, so that its two side members 2, 2' can be resiliently forced apart when the magnetic tape cassettes 3 are inserted. The magnetic tape cassettes are thus clamped between the side members and hence held firmly in the magazine. The trough bottom 4 is provided with ribs 5 which taper conically toward the large open side of the trough and are about 3 mm high; the magnetic tape cassettes 3 are accommodated between these ribs. It is advantageous if the width of the ribs is such that the magnetic tape cassettes touch at the lateral raised portions which are on a level with the functional openings in the front wall, so that a compact and stable pack results. Two holes 6 are provided between adjacent ribs 5 for the passage of ejector pins for unloading the magazine. Holes 7 in the ribs at the ends of the trough 1 serve to accommodate centering members in the assembly stations.

The inner surface of each of the side members 2, 2' is provided, over its entire length, with a strip 8 of resilient material. Preferably, a felt covering is used, which is secured to the side members by means of a self-adhesive layer. The strips 8, which are thus easily replaceable, ensure that the magnetic tape cassettes 3 seat firmly in the magazine in every position, and prevent rubbing and scuffing of the cassettes against the side members during transportation.

To enable the magazines to be stacked, the side members 2, 2' project above the inserted cassettes. For this purpose, it is advantageous to provide, on the underside of the trough 1 below the side members, grooves 9, 9' which register with the upper edges 10 of the side members 2, 2'.

To enable a plurality of magazines to be employed, they can be connected together in a row, in a fixed or detachable manner. For this purpose, the side members 2, 2' are provided with grooves 11, 11' at one end, which grooves extend over the height of the side members, and with corresponding tongues 12, 12' at the other end.

We claim:

1. A magazine for magnetic tape cassets, comprising a trough which is U-shaped in cross section and possesses a plurality of transverse ribs on the bottom, the ribs being arranged at intervals corresponding to the thickness of a magnetic tape cassette, said trough is open at both ends and the two side members of the trough project above the inserted magnetic tape cassettes, said trough is designed so the two side members are capable of being resiliently bent apart for insertion of said cassets and are each provided on their inner surfaces over their entire length and nearly their entire height with a strip of resilient material, the clear width between the side members as covered by said strips being smaller, by an amount about equal to the reduction in the thickness of the strips in the compressed state, than the relevant dimension of the magnetic tape cassettes which are to be inserted, such that the cassettes, upon insertion into the magazine, are held for storage, in any attitude of said magazine, due to the combined holding action of said side members of said strips.

2. A magazine as claimed in claim 1, wherein the trough bottom possesses one or more holes between adjacent ribs.

3. A magazine as claimed in claim 1, wherein the trough is provided, on its underside, with grooves which register with the upper edges of the two side members.

4. A magazine as claimed in claim 1, wherein the side members at one end each possess a groove extending over the height of the side member, and the side members at the other end each possess a tongue which registers with this groove.

* * * * *

UNITED STATES PATENT AND TRADEMARK OFFICE
CERTIFICATE OF CORRECTION

PATENT NO. : 4,366,903
DATED : Jan. 4, 1983
INVENTOR(S) : Gaiser et al

It is certified that error appears in the above-identified patent and that said Letters Patent are hereby corrected as shown below:

Claim 1:

| Col. 3, line(s) | 2, | delete "cassets" and substitute -- cassettes -- ; |
| " . 3, " | 10,11, | delete "cassets" and substitute -- cassettes -- ; |
| " . 4, " | 4, | delete "of" and substitute -- and -- . |

Signed and Sealed this

Twenty-ninth Day of March 1983

[SEAL]

Attest:

GERALD J. MOSSINGHOFF

Attesting Officer   Commissioner of Patents and Trademarks